(12) United States Patent
Upton

(10) Patent No.: US 6,539,159 B1
(45) Date of Patent: Mar. 25, 2003

(54) ADAPTIVE SUPPORT FOR POSITIONING OPTICAL COMPONENTS

(75) Inventor: Eric Lawrence Upton, Bellevue, WA (US)

(73) Assignee: Terabeam Corporation, Kirkland, WA (US)

( * ) Notice: Subject to any disclaimer, the term of this patent is extended or adjusted under 35 U.S.C. 154(b) by 51 days.

(21) Appl. No.: 09/805,675

(22) Filed: Mar. 13, 2001

(51) Int. Cl.[7] .................................................. G02B 6/00
(52) U.S. Cl. ...................................... 385/134; 359/152
(58) Field of Search .......................... 385/134; 359/152, 359/159, 172

(56) References Cited

U.S. PATENT DOCUMENTS

| | | | | |
|---|---|---|---|---|
| 4,543,663 A | * | 9/1985 | Laor | 359/159 |
| 5,347,387 A | * | 9/1994 | Rice | 359/152 |
| 5,390,040 A | * | 2/1995 | Mayeux | 359/152 |
| 5,886,800 A | * | 3/1999 | Aprahamian et al. | 359/16 |
| 6,239,888 B1 | * | 5/2001 | Willebrand | 359/159 |
| 6,381,055 B1 | * | 4/2002 | Javitt et al. | 359/152 |

* cited by examiner

Primary Examiner—Lynn Field
Assistant Examiner—Brian S. Webb
(74) Attorney, Agent, or Firm—Blakely Sokoloff Taylor & Zafman LLP

(57) ABSTRACT

An apparatus for positioning an optical component, such as a lens or reflector. Positioning of the optical component is facilitated by an adaptive support that is coupled to the optical component on one end, and secured to a generally static structure at an opposing end. The adaptive support comprises a flexible support member on which a plurality of piezoelectric elements are mounted. In response to differential voltages applied to selected piezoelectric elements, localized portions of the flexible support member are caused to extend or contract. As a result, this localized extension and contraction alters the configuration of the adaptive support such that the orientation and/or position of the optical component are changed. In one embodiment corresponding to an off-axis Cassegrain reflective collector, the apparatus provides a mechanisms that maintains the location of the collector's focal point by compensating for temperature variations and changes to an incoming optical signal, and additionally enables the direction of outgoing signals to be controlled.

21 Claims, 6 Drawing Sheets

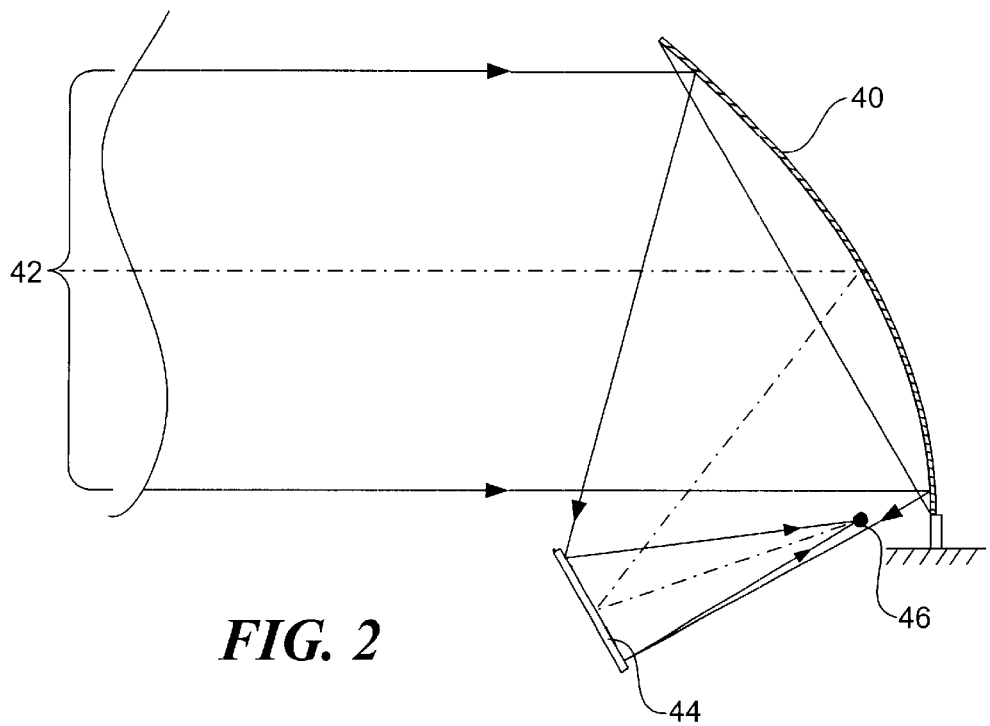
FIG. 2
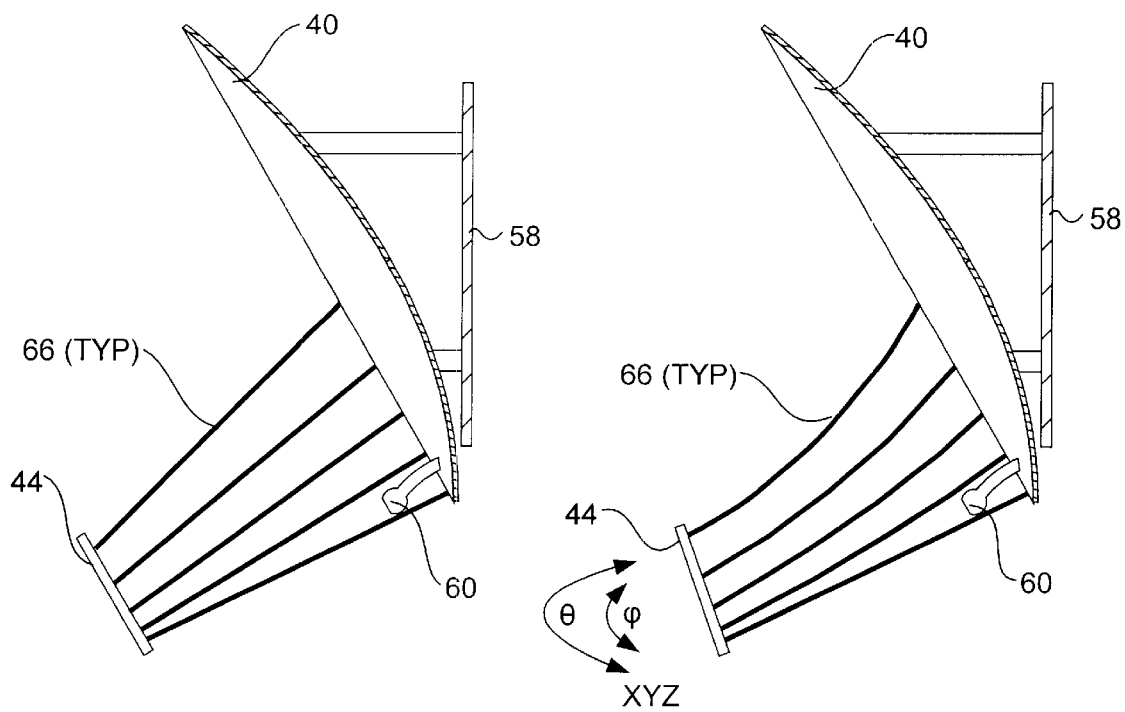
FIG. 7A  FIG. 7B

| φ | θ | X | Y | Z | 1 | 2 | 3 | 4 | 5 | 6 | ... | 12 | 13 | 14 | 15 | 16 | 17 | 18 | 19 | 20 | 21 | ... | 28 | 29 | 30 |
|---|---|---|---|---|---|---|---|---|---|---|---|---|---|---|---|---|---|---|---|---|---|---|---|---|---|
| 0 | 0 | 0 | 0 | 0 | 0 | 0 | 0 | 0 | 0 | 0 | ... | 0 | 0 | 0 | 0 | 0 | 0 | 0 | 0 | 0 | 0 | ... | 0 | 0 | 0 |
| -.25 | 0 | 0 | 0 | 0 | -1 | -1 | -1 | 0 | 0 | 0 | ... | 0 | 1 | 1 | 1 | 1 | 1 | 1 | 0 | 0 | 0 | ... | -1 | -1 | -1 |
| -.5 | 0 | 0 | 0 | 0 | -1 | -1 | -1 | -1 | -1 | -1 | ... | 1 | 1 | 1 | 1 | 1 | 1 | 1 | 1 | 1 | 1 | ... | -1 | -1 | -1 |
| ⋮ | | | | | | | | | | | | | | | | | | | | | | | | | |
| 0 | .25 | 0 | 0 | 0 | 1 | 1 | 1 | 0 | 0 | 0 | ... | 0 | 0 | 0 | 0 | 0 | 0 | 0 | 0 | 0 | 0 | ... | -1 | -1 | -1 |
| 0 | .5 | 0 | 0 | 0 | 1 | 1 | 1 | 1 | 1 | 1 | ... | 0 | 0 | 0 | 0 | 0 | 0 | 0 | 0 | 0 | 0 | ... | -1 | -1 | -1 |
| ⋮ | | | | | | | | | | | | | | | | | | | | | | | | | |
| -.25 | .25 | 0 | 0 | 0 | 1 | 1 | 1 | 0 | 0 | 0 | ... | 0 | -1 | -1 | -1 | -1 | -1 | -1 | -1 | -1 | 0 | ... | -1 | -1 | -1 |
| -.5 | -.5 | 0 | 0 | 0 | 1 | 1 | 1 | 1 | 1 | 1 | ... | -1 | -1 | -1 | -1 | -1 | -1 | -1 | -1 | -1 | -1 | ... | -1 | -1 | -1 |
| ⋮ | | | | | | | | | | | | | | | | | | | | | | | | | |

LEFT HAND PORTION     RIGHT HAND PORTION

ADAPTIVE SUPPORT FOR POSITIONING OPTICAL COMPONENTS

BACKGROUND OF THE INVENTION

1. Field of the Invention

The present invention relates generally to optical systems and, more specifically, to an apparatus for positioning optical components, such as those used in optical communications systems.

2. Background Information

With the increasing popularity of wide area networks (WANs), such as the Internet and/or the World Wide Web, network growth and traffic has exploded in recent years. Network users continue to demand faster networks and more access for both businesses and consumers. As network demands continue to increase, existing network infrastructures and technologies are reaching their limits.

An alternative to present day hardwired or fiber network solutions is the use of wireless optical communications. Wireless optical communications utilize point-to-point communications through free space and therefore do not require the routing of cables or fibers between locations. Thus, wireless optical communications are also known as free space or atmospheric optical communications. For instance, in a free space optical communication system, a beam of light is directed through free space from a transmitter at a first location to a receiver at a second location. Data or information is encoded into the beam of light, and therefore, the information is transmitted through free space from the first location to the second location.

An important aspect of a free space optical communications system is tracking. In particular, it is important that the optical communications beam (e.g., laser beam) is aimed properly from the transmitter at the first location and that the receiver at the second location is aligned properly to receive the optical communications beam. For example, assume that a transmitter is mounted on a first building and that a receiver is mounted on a different second building. Assume further that there is a line of sight between the transmitter and receiver. It is important for the transmitter on the first building to be configured to accurately direct or aim the optical communications beam at the receiver on the second building.

Tracking is utilized for maintaining the alignment of the optical communications beam between the transmitter and receiver in various situations or disturbances. Examples of these various situations or disturbances include the swaying of the buildings due to for example windy conditions, vibration of the platforms on which the transmitter and/or receiver are mounted, atmosphere-induced beam steering, etc. If the tracking system is unable to compensate for disturbances, the optical communications beam is no longer properly aimed at the receiver and, consequently, communications between the transmitter and receiver are lost or impaired.

SUMMARY OF THE INVENTION

The present invention provides an apparatus for positioning an optical component, such as a lens or reflector. Positioning of the optical component is facilitated by an adaptive support that is coupled to the optical component on one end, and secured to a generally static structure, such as another optical component or base, at an opposing end. The adaptive support comprises a flexible support member on which a plurality of piezoelectric elements are mounted. In response to differential voltages applied to selected piezoelectric elements, localized portions of the flexible support member are caused to extend and contract. As a result, this localized extension and contraction alters the configuration of the adaptive support such that the orientation and/or position of the optical component are changed.

According to one embodiment, the adaptive support is used to couple a primary reflector to a secondary reflector, wherein the reflectors are arranged in an off-axis Cassegrain reflective collector configuration. By applying controlled differential voltages to selected piezoelectric elements, the apparatus enables the focal point of the collector to be maintained at a desired location, thereby providing compensation for changes in the direction and/or location of an incoming signals, and compensation for physical variations in the optics (e.g., due to temperature changes) of the collector. Similarly, the apparatus enables the direction of outgoing signals to be controlled such that they may be directed toward a desired target location. In this embodiment, the flexible support member has a configuration similar to a section of a truncated cone when coupled to the primary and secondary reflectors, and has a truncated pie-shaped configuration when in a "flattened" condition. In addition, the piezoelectric elements are configured in a radial array when the flexible support member is flattened. As a result, the adaptive support functions as a plurality of flexible struts that are connected between the primary and secondary reflectors, whereby the length of the struts can be altered by selectively applying differential voltages to piezoelectric elements corresponding to those struts. In one embodiment, the flexible support member comprises a printed circuit board that includes a plurality of electrical traces that enable input voltages supplied at a connector to be routed to appropriate piezoelectric elements. To facilitate bending, the printed circuit board includes a plurality of radial perforations. Alternatively, a flex-circuit of similar configuration may be used.

According to other aspects of the invention, a control system is provided for controlling the orientation and/or position of the secondary reflector relative to the primary reflector. In one embodiment, the control system provides a lookup table that enables orientations and/or positions that are stored in the lookup table to be attained by providing appropriate differential voltages to selected piezoelectric elements based on entries in the lookup table corresponding to the row that contains the orientation and position entries. In one implementation of the control system, an acquire mode is facilitated by the lookup table, whereby an incoming or outgoing optical signal can be acquired by moving the secondary reflector to a desired orientation and position based on data in the lookup table. According to further aspects of the control system, a closed loop feedback scheme is provided that enables the control system to implement a tracking mode, whereby a maximal signal strength for an incoming or outgoing optical signal is maintained through fine adjustments of the orientation and position of the secondary reflector.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 2 illustrates an off-axis Cassegrain reflective collector implementation of the present invention that alleviates the obscuration problem by placing the secondary reflector away from the axis of the optical signal being received by the primary reflector;

FIGS. 7A and 7B are elevation cut-away views of the off-axis Cassegrain reflective collector before and after actuation of selected piezoelectric elements whereby the effect of the piezoelectric elements are modeled as a plurality of flexible struts that are connected between the primary and secondary reflectors;

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

In one example embodiment of the present invention, point-to-point free space optical communications are provided from a transmitter to a receiver. The transmitter and receiver may be located at the same location or at different locations such as on different buildings within a line of sight of each other. In one embodiment, the line of sight may include reflections off one or more reflective surfaces between the transmitter and receiver in accordance with the teachings of the present invention. It is appreciated that the transmitter and the receiver may be parts of transceivers, or transmitter-receiver combinations, at their respective locations, such that bi-directional communications are provided. In the example embodiment, the transmitter includes an optical source that generates an optical communications beam, such as a laser beam or the like, on which data or information is modulated. The optical communications beam is not limited to being monochromatic or to any particular wavelength or color and may include the visible light as well as ultra violet or infra-red portions of the spectrum.

Figure 1A:
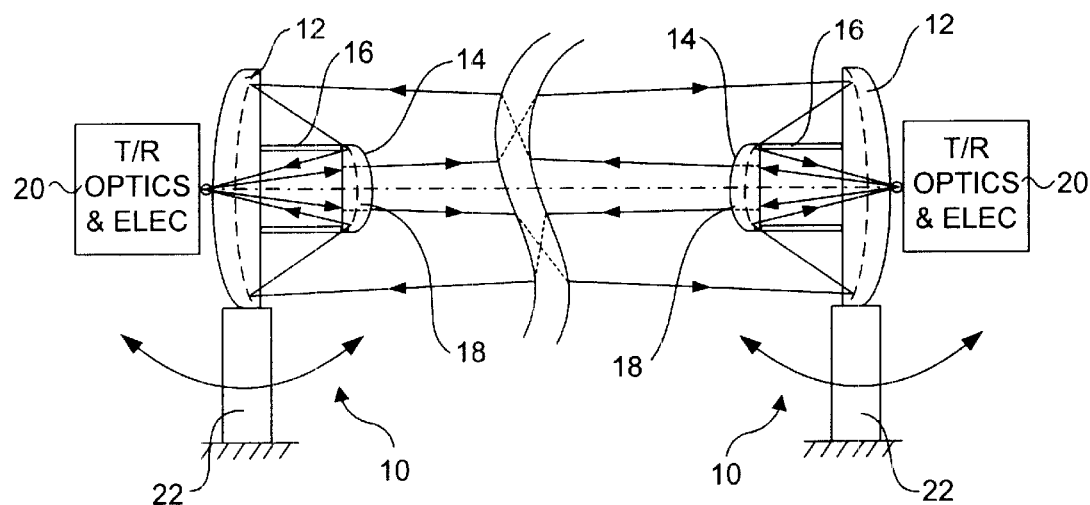
FIG. 1A is an illustration of a convention optical communications system that uses on-axis primary and secondary reflectors and provides transmitting and receiving capabilities at a pair of transceiver stations disposed at remote locations.
Figure 1B:
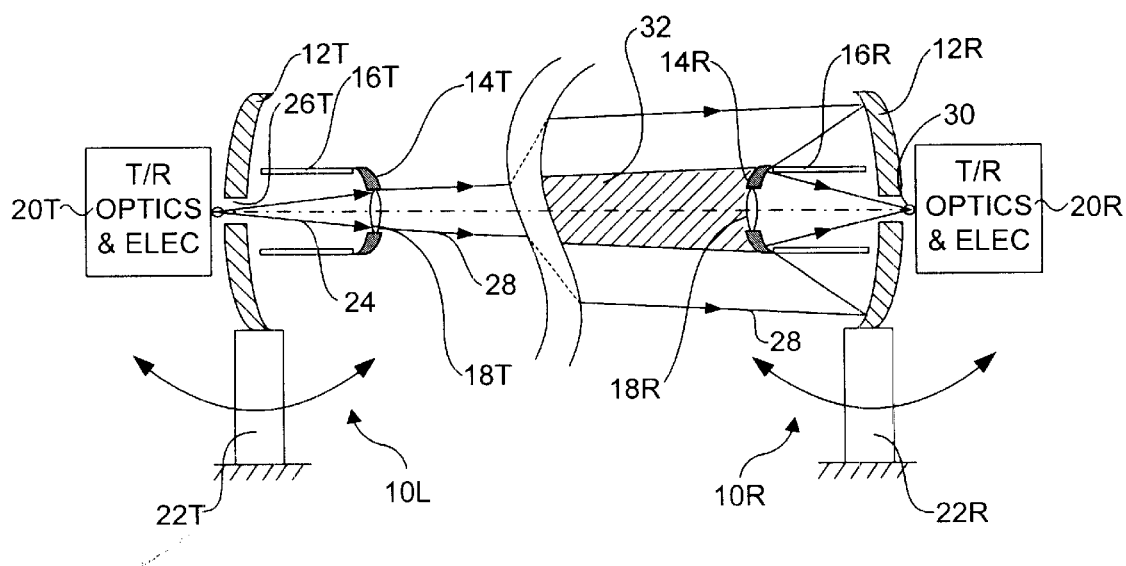
FIG. 1B shows how an optical signal is transmitted by a first transceiver station and received by a second transceiver station, whereby a portion of the optical signal is obscured by the secondary reflector of the transceiver station that receives the signal.
Figure 3A:
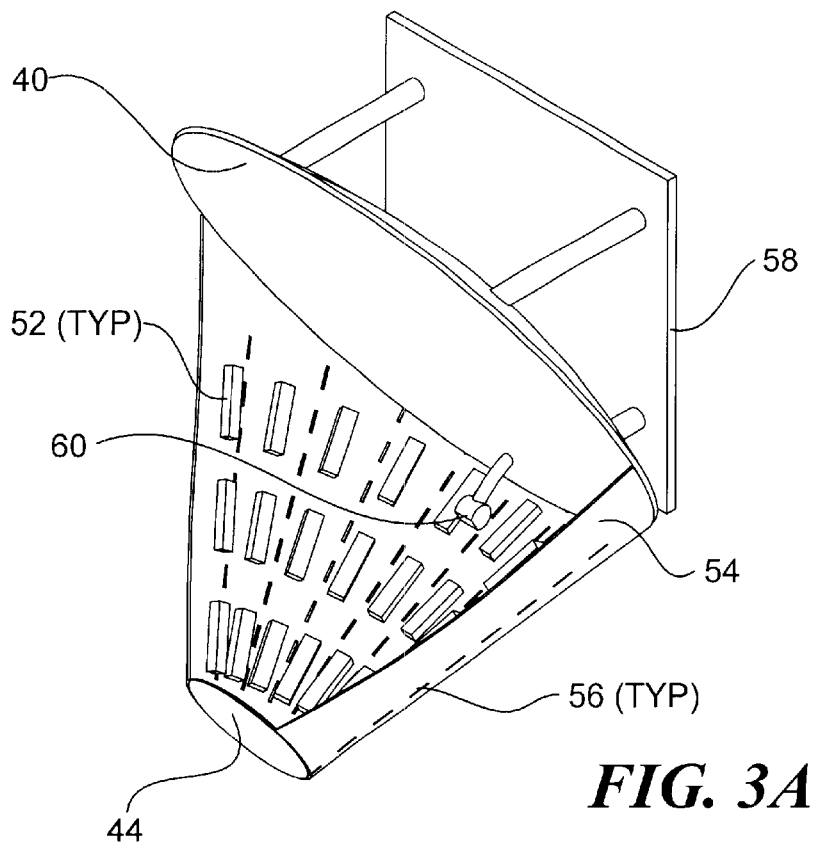
FIG. 3A and 3B show isometric views of an exemplary embodiment of the adaptive support of the present invention when implemented in an off-axis Cassegrain reflective collector.
Figure 3B:
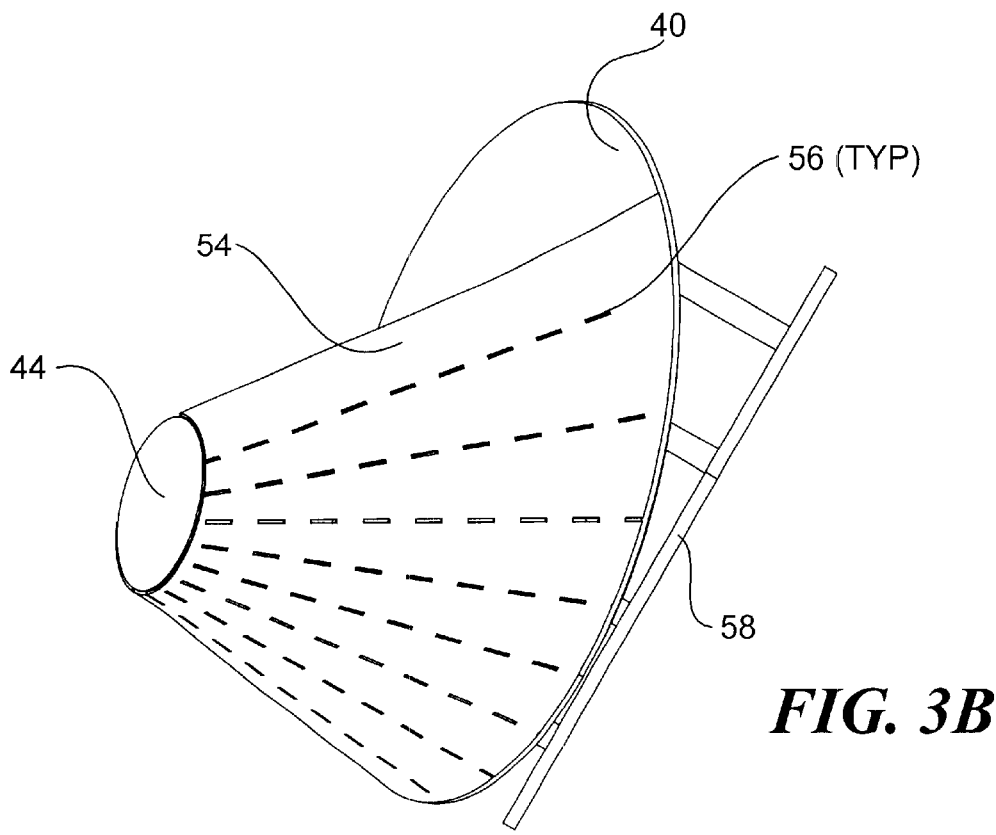
Figure 3C:
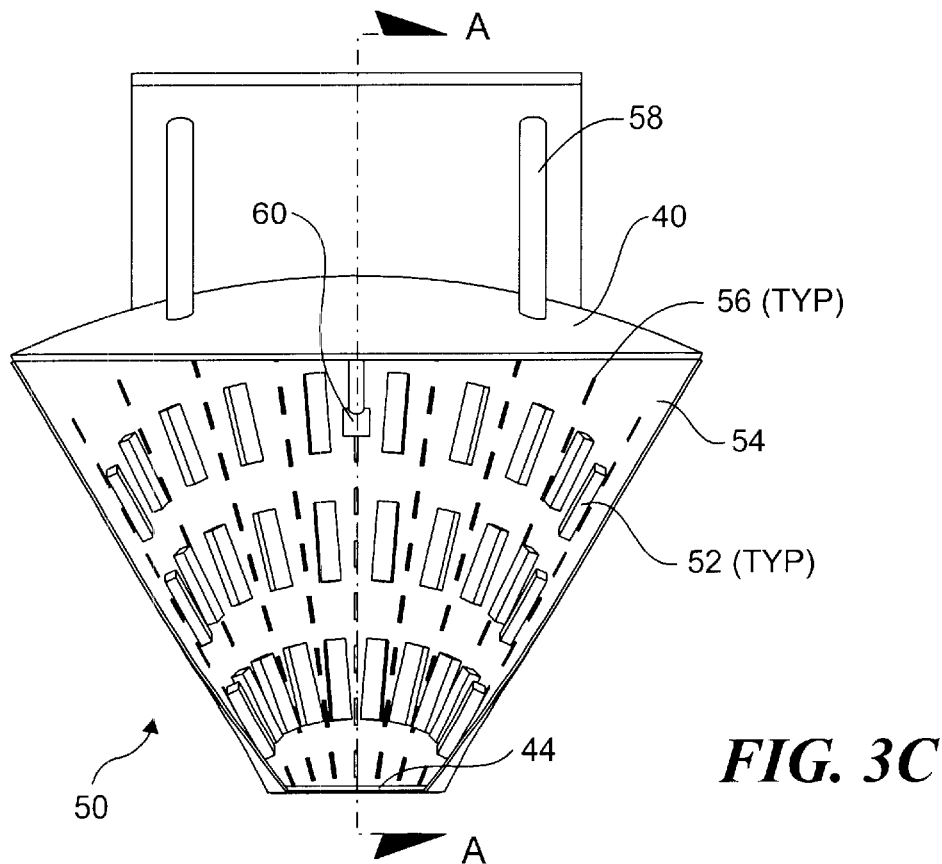
FIG. 3C shows a plan view of the adaptive support implementation shown in FIGS. 3A and 3B; is an end view of the electromagnetic positioner of FIG. 1.
Figure 4:
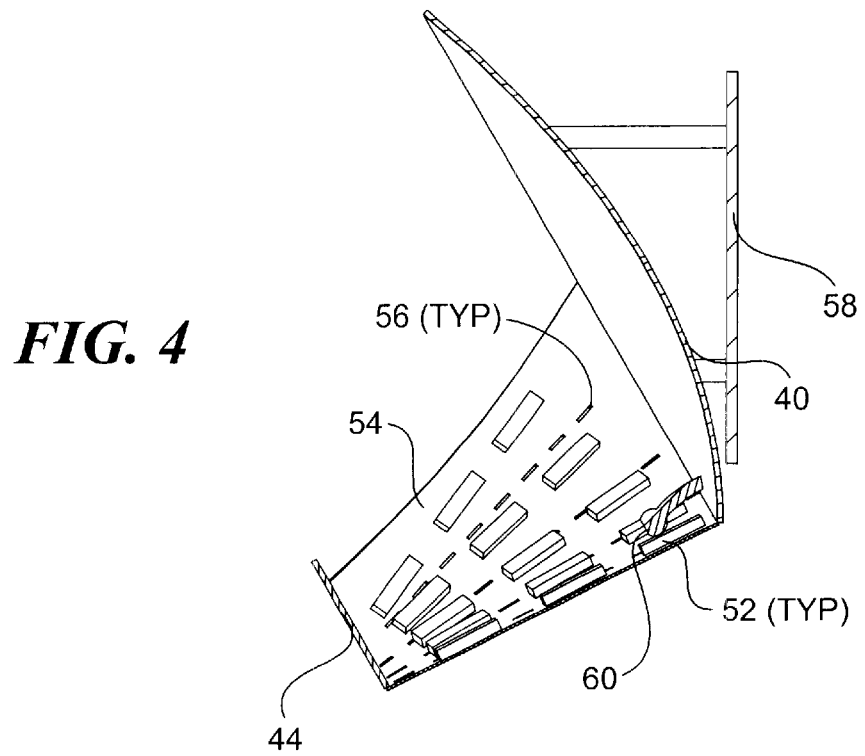
FIG. 4 shows an elevation cut-away view of the adaptive support structure corresponding to a section cut AA depicted in FIG. 3B.

A conventional free space optical system is shown in FIGS. 1A and 1B. The free space optical system includes a pair of transceiver stations 10 that are typically located on or in separate buildings or towers. Each transceiver station 10 includes a primary collector 12 to which a secondary mirror 14 is coupled via a plurality of rigid struts 16. The transceiver stations further include a transmitted signal lens 18 mounted within secondary mirror 14, and a set of transmitter/receiver optics and electronics 20. All of components 12, 14, 16, 18, and 20 are operatively coupled to a yoke that is connected to a base 22 via a gimble assembly, such that these components are all moved in response to a gimbled movement of the yoke relative to a static surface on which the base 22 is placed.

With reference to FIG. 1B, data is transmitted from a transceiver station 10L to a transceiver station 10R in the following manner. An optical signal 24 is generated by transmitter/receiver optics and electronics 20T of transceiver station 10T and directed through an opening 26T defined in primary collector 12T towards transmitted signal lens 18T, which produces a collimated signal 28. As collimated signal 28 moves toward transceiver station 10R, the width of the signal diverges very gradually. As will be recognized by those skilled in the art, the divergence of the various optical signals depicted in the Figures contained herein are exaggerated for clarity. Upon reaching transceiver station 10R, the outer portions of collimated signal 28 impinge upon primary collector 12R, which comprises a concave mirrored surface that redirects those portions of the signal that impinge upon it toward secondary mirror 14R. Collimated signal 28 is then reflected by secondary mirror 14R towards the secondary mirror's focal point 30, where it is received by transmitter/receiver optics and electronics 20R.

One disadvantage with the configuration of transceiver station 10 is that a central portion 32 of collimated signal 28 is obscured by secondary mirror 14 and transmitted signal optics 18. As a result, a significant portion of the optical signal is made unusable. Another disadvantage of this configuration is that the entire optical assembly (i.e., components, 12, 14, 16, 18, and 20) must be rotated by gimbled base 22 to account for environmental disturbances such as building sway. Furthermore the available positional bandwidth (i.e., the maximum frequency at which positions can be changed) when using a gimbled mechanism of the type typically employed for such stations is limited by physical considerations, such as inertia, mechanical vibrations, servo motor constraints, friction, etc.

One scheme for addressing the obscuration problem is to arrange a primary and a secondary reflector in an off-axis Cassegrain reflective collector configuration, such as the configuration shown in FIG. 2. This configuration includes a primary reflector 40 that receives an incoming optical signal 42 and reflects the optical signal toward a secondary reflector 44, which reflects the optical signal it receives back towards a focal point 46. Under typical implementations, a detector (not shown) will be placed to coincide with focal point 46 such that a maximum signal level is received by the detector. As discussed below, the off-axis Cassegrain reflective collector configuration may also be used to control the direction of outgoing signals that originate from the focal point of the secondary reflector.

In order to redirect optical signals in an off-axis Cassegrain reflective collector configuration, it is necessary that primary reflector 40 be non-symmetrical about its horizontal axis; typically, the primary reflector will have a parabolic configuration. The non-symmetry of this optical component generally causes focal point 46 to move when temperature changes occur. Accordingly, a compensation scheme is desired to maintain focal point 46 at a desired location, e.g., coincident with an input for the detector.

Another problem that is encountered is a change in the direction (i.e., the incidence angle of incoming optical signal 42 relative to primary reflector 40) and/or the location of an incoming optical signal (i.e., what portion of primary reflector 40 receives the incoming optical signal. For example, the amount of primary reflector 40 that receives incoming optical signal 42 in FIG. 2 represents an ideal condition; in many circumstances, portions of the incoming optical signal may miss the primary reflector entirely. If both primary and secondary reflectors 40 and 44 remain fixed, the location of focal point 46 will move as the direction and location of incoming optical signal 42 changes. To combat this effect, it is desirable to be able to position secondary reflector 44 relative to primary reflector 40 such that focal point 46 remains coincident with the detector.

The present invention provides a compensation mechanism that addresses the foregoing positioning task by means of an adaptive support that enables secondary reflector 44 to be positioned relative to primary reflector 40 by controlling voltage inputs that are applied to selected piezoelectric elements among a plurality of piezoelectric elements mounted to the support. An exemplary embodiment of such an adaptive support 50 is shown in FIGS. 3A–C and 4. Adaptive support 50 includes a plurality of piezoelectric elements 52 mounted to a flexible support member 54. In one configuration, flexible support member 54 comprises a printed circuit board in which a plurality of perforations 56 are formed, thereby enabling the support member to flex. In alternative embodiments, flexible support member 54 may comprise a flex-circuit.

One end of flexible support member 50 is coupled to secondary reflector 44, while the other end is coupled to primary reflector 40. As depicted in the Figures, primary reflector 40 is maintained in a fixed position by means of a bracket 58. Although under typical operations primary reflector 40 will be positioned in a fixed alignment, it will be understood that the present invention may be implemented in systems that employ movable primary reflectors as well as fixed primary reflectors.

Also depicted in the Figures is a detector/emitter 60, which may be mounted to primary reflector 40, flexible support member 50, or otherwise operatively coupled to bracket 58. When used on a receiving side of an optical communications path, detector/emitter 60 will typically comprise a detector component (or input of a detector component) suitable for receiving an incoming optical signal. Such an implementation is depicted in FIGS. 3A–C and 4. When used at the transmitting side of an optical communications path, detector/emitter 60 will typically comprise a light source from which an optical signal is emitted.

Piezoelectric materials have a particular crystalline molecular structure that enables components manufactured from such materials to expand or contract when a voltage differential is applied across appropriate input points on the components. Typically, the direction of the expansion and contraction can be controlled using appropriate manufacturing techniques. For example, piezoelectric elements having elongated configurations that expand or contract in the direction of their elongated axis are manufactured by several vendors.

Figure 5A:
FIGS. 5A, 5B, and 5C respectively show cross-sections of a piezoelectric element mounted on a printed circuit board when no input voltage is applied across the piezoelectric element, when a positive input voltage is applied across the piezoelectric element, and when a negative voltage is applied across the piezoelectric element.
Figure 5B:
Figure 5C:
Figure 6:
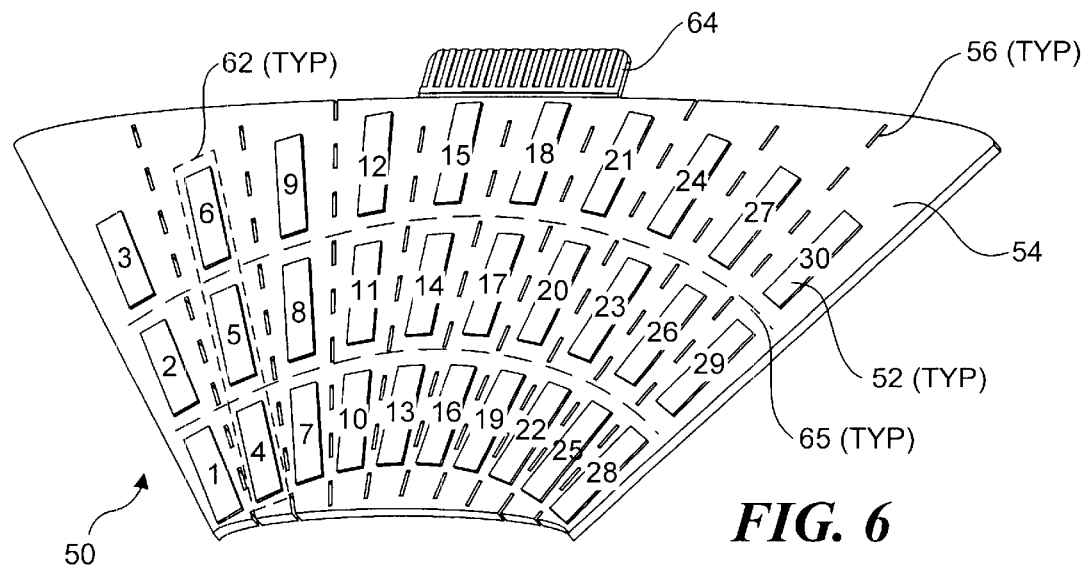
FIG. 6 shows a "flattened" configuration of the adaptive support shown in FIGS. 3A–C and 4.

With reference to FIGS. 5A–C, activation of an input voltage across opposing faces piezoelectric element 52 having a substantially elongated rectangular configuration similar to that shown in FIG. 6 causes the piezoelectric element to extend or contract, depending on the direction of the voltage differential. In general, the amount of extention or contract is a linear function of the length of the element, and the voltage level. For instance, piezoelectric elements may be characterized by an expansion coefficient defined in $\mu$m/mN (micrometer/meter/volt). By using an appropriate manufacturing process, piezoelectric elements 52 can be mounted to flexible support member 54 such that application of a positive voltage differential across the piezoelectric element causes both the piezoelectric element and a localized portion of flexible support member 54 proximate to the piezoelectric element to be extended, as depicted in FIG. 5B. Similarly, application of a negative voltage differential across the same ends of the piezoelectric element causes the the piezoelectric element and the localized portion of flexible support member 54 proximate to the piezoelectric element to contract, as depicted in FIG. 5C.

In one embodiment, flexible support member 54 is manufactured using conventional printed circuit board (PCB) manufacturing techniques. Accordingly, in this embodiment flexible support member 54 comprises a thin fiberglass PCB on which a plurality of traces (not shown) are deposited including pads 53 and 55 to provide power to various piezoelectric elements 52, which are mounted to the pads using a wave soldering process. In one embodiment, a silver epoxy paint or other conductive material is applied to both the upper surface and lower surface of piezoelectric element 52, except for a small gap 57 on the lower surface. An end portion 59 or the piezoelectric element is then dipped in the silver epoxy paint. The configuration of the painted areas on the lower surface of piezoelectric element 52 is designed such that the painted areas mate with underlying pads 53 and 55. As a result, an electrical input 61 applied to pad 55 produces a voltage potential on the top surface of piezoelectric element 52, while a grounded input 63 applied to pad 53 produces a reference voltage on the lower surface of piezoelectric element 52. Depending on whether the voltage potential of electrical input 61 is positive (FIG. 5B) or negative (FIG. 5C) relative to the reference voltage, piezoelectric element 52, as well as localized portions of flexible support member 54 (i.e., the fiberglass board), are caused to extend or contract, respectively.

An another embodiment, piezoelectric elements 52 are mounted to the fiberglass sheet using a suitable adhesive and electrically coupled to the traces using wire bounding or metal clips that are attached to the PCB and provided with electrical input via appropriate vias in the PCB. Additionally, to enable flexible support member 54 to be reconfigured from that flat configuration it is manufactured in, a plurality of perforations 56 may be defined in the flexible support member, as necessary. Optionally, a plurality of perforations 65 that are substantially orthogonal to perforations 56 and in between piezoelectric elements 52 may be added. It will be appreciated that the specific parameters (e.g., depth, length, and width) and configuration of the perforations will depend on the particular implementation the the adaptive support structure is used in. Optionally, flexible support member 54 may be made of a flex-circuit material, in which case it generally will not be necessary to include perforations 56 or 65.

A "flattened" configuration of adaptive support 50 is shown in FIG. 6. As shown in the Figure, sets of piezoelectric elements 52 are radially-arrayed over a substantially truncated "pie-shaped" flexible support member 54. In addition, perforations 56 are defined in the flexible support member so as to form a plurality of "spokes," while perforations 65 form arcs of substantially constant radius. As is explained in further detail below, each radial group 62 of piezoelectric elements 52 is configured so as to cause a localized portion of flexible support member 54 proximate to those piezoelectric elements to function as a flexible "strut" through extension or contract of that localized portion. Activation of the piezoelectric elements is facilated by a connector 64 that is electrically coupled to the traces, whereby application of input voltages to selected pins on the connector will cause corresponding piezoelectric elements to be activated. It is noted that the location and type of connector depicted in FIG. 6 are merely exemplary, as will be recognized by those skilled in the art, as a variety of connector configurations and locations may be used. Furthermore, it will be understood that although the piezoelectric elements depicted in FIG. 6 are approximately the same size, different sizes may be used, as well as single elongated elements and wedge-shaped elements.

The operation of the present invention is modeled in FIGS. 7A and 7B, which depicts a primary reflector 40 coupled to a secondary reflector 44 by means of a plurality of flexible struts 66. Flexible struts 66 are used to model localized portions of flexible support member 54 proximate to piezoelectric elements 52. FIG. 7A depicts an initial configuration in which no power is supplied to the piezoelectric elements. In FIG. 7B, a voltage differential that progressively increases as one moves from the center of flexible support member 54 towards the outer edges is applied to the piezoelectric elements, causing a rotation of secondary reflector 44 in the plane of the Figure, designated as a $\phi$ axis. It will be understood that the amount of rotation depicted in FIG. 7B is exaggerated for illustrative purposes, and that the actual amount of rotation will typically be a few degrees or less. Furthermore, it will be understood that by varying the voltage differential applied across selected piezoelectric elements 52, secondary reflector 44 can be rotated about any axis, including a $\theta$ axis that is perpendicular to the $\phi$ axis. Furthermore, selected activation of the piezoelectric elements may cause a reference datum point (not shown) on secondary reflector 44 to be positioned relative to an XYZ coordinate position system.

Under typical implementations, it will be desirable to position secondary reflector 44 relative to primary reflector 40 to either maximize the energy level of an incoming optical signal that is received at detector/emitter 60, or cause an outgoing signal produced at detector/emitter 60 to be directed toward a desired target. Accordingly, a control system is provided for controlling the relative positions of the reflectors. The control system provides two primary modes of operation: an acquisition mode, and a tracking mode. Under the acquisition mode, it is desired to "acquire" a signal; which will typically involve moving the secondary reflector in coarse movements until an incoming optical signal is locally detected or an outgoing optical signal is remotely detected (i.e., the optical signal is detected at a receiving apparatus that is remote from the sending apparatus). Under the tracking mode, finer movements to the secondary reflector will be applied so as to maintain a maximal signal strength.

Figures 8, 9:
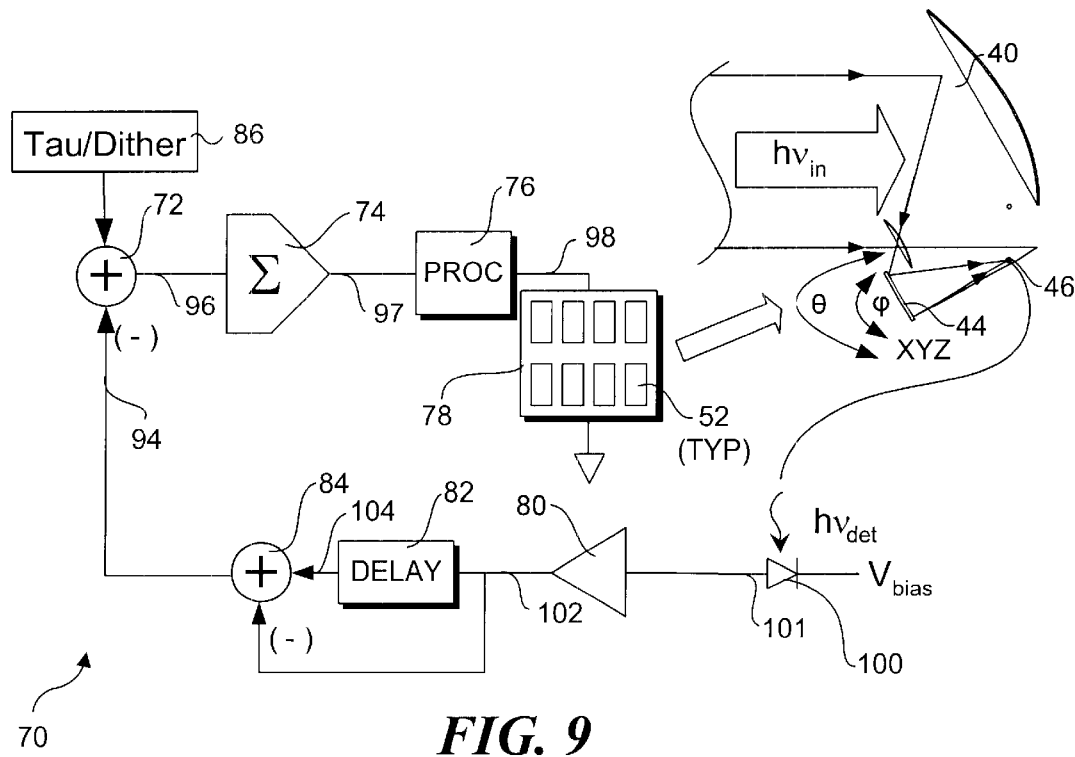
FIG. 8 is an exemplary lookup table implemented by the control system of the present invention to control the position of the secondary reflector.
FIG. 9 is a block schematic diagram illustrating a servo control loop implemented by the control system when functioning in a tracking mode.

In one embodiment, the acquisition mode may be implemented using a position lookup table, wherein a desired position may be attained by looking up that position in the lookup table and applying a set of voltage differential values that are defined for that position in the lookup table to corresponding piezoelectric elements 52. An exemplary lookup table 68 is illustrated in FIG. 8. The left hand portion of lookup table 68 defines dimensional values corresponding to an orientation and coordinate position of secondary reflector 44 through orthogonal rotational angle values $\theta$ and $\phi$ in combination and XYZ coordinate position values corresponding to the location of the datum point on secondary reflector 44. The right hand portion of lookup table 68 comprises 0's, 1's, and −1's, respectively indicating whether no input voltage is provided to the piezoelectric element for that column, a positive input voltage is provided, or a negative input voltage is provided to attain the orientation and coordinate position for each of the rows stored in the lookup table. By defining positional information in this manner, any orientation and coordinate position that is defined in the table can be attained by providing appropriate input voltages to selected piezoelectric elements 52 based on the values in the row corresponding to that orientation and coordinate position.

In general, the values in lookup table 68 may be derived through empirical testing, which may involve the use of external measuring equipment. In addition, various values in the table may be interpolated from data derived during empirical testing, or calculated by means of numerical analysis. For example, a finite-element model of the adaptive support could be evaluated using various input voltage combinations to predict the resultant orientation and position of secondary reflector 44.

As presented above, the right hand portion of lookup table 68 includes simplified numerical values that identify whether particular piezoelectric elements are activated or not, and the direction of the voltage differential. Optionally, the portion of the table may comprise variable voltage values, which generally will enable even finer adjustments to be made. In order to supply variable voltage values, it will be necessary to include appropriate drive circuitry that enables controllable differential voltages to be applied to the inputs of individual piezoelectric elements 52. An exemplary circuit for facilitating this requirement comprises a voltage divider network coupled to a plurality of amplifiers and switches, whereby a logic-level drive signal may be used to produce desired voltage levels at selected piezoelectric elements. In alternative implementations, programmable voltage devices may be used for this purpose. Other similar techniques will be known to those skilled in the art.

Once an incoming or outgoing optical signal has been acquired, the tracking mode can be implemented. The tracking mode is use to finely tune the orientation and coordinate position of secondary reflector 44, thereby controlling the position of focal point 46 for an incoming optical signal or controlling the direction of an outgoing optical signal. In general, the tracking mode will have a higher bandwidth than the acquire mode, and will be used to compensate for higher frequency disturbances, such as vibrations and the like.

With reference to FIG. 9, a servo control loop 70 suitable for use in the tracking mode includes a summing block 72, an integrator 74, a processor 76, and piezoelectric element matrix 78, an amplifier 80, a delay block 82, and a summing block 84. Servo control loop 70 works in the following manner when operating on an incoming optical signal. A tau-dither signal 86 used for finely adjusting the position of secondary reflector 44 is received at summing block 76, from which a feedback signal 94 is subtracted to produce an error signal 96. Error signal 96 is then integrated by integrator 74 to produce an integrated error signal 97, which is then input into processor 76. In one embodiment, processor 76 will process the error signal based on the present orientation angles φ and θ, and coordinate positions X, Y, and Z, which it may internally calculate or derive from lookup table 68 to obtain a set of voltage values 98 to drive selected piezoelectric elements 52, as represented by piezoelectric element matrix 78. The resulting effect of activating the selected piezoelectric elements with these drive voltages will cause a change in position to secondary mirror 44, which will produce a detected signal strength $hv_{det}$, as measured at a detector 100.

In response to the strength of the optical signal that reaches detector 100, the detector will produce a signal 101 that is received by amplifier 80, which produces an output signal 102. Output signal 102 is then fed into delay block 82 to produce a delayed signal 104 that is received by summing block 84. In addition, output signal 102 is provided as a negative input to summing block 84. As a result, output signal 102 is subtracted from delayed signal 104, thereby providing a differentiation function, i.e., dv/dt, the results of which comprise feedback signal 94. Accordingly, feedback signal 94 represents a rate of change in the signal strength measured at detector 100. As a result, if a new position of secondary reflector 44 produces a lower signal strength, the control system will cause secondary reflector 44 to be moved in an opposite direction as a result of the negative feedback scheme implemented by the control loop, while if the new position produces an increased signal strength the secondary reflector will be moved in the same direction.

As will be recognized by those skilled in the art, many of the block-level components of servo control loop 70 may be implemented using conventional analog and/or digital blocks, or the entire servo control loop may be implemented digitally using an appropriately programmed digital signal processor (DSP), ASIC (application specific integrated circuit), microcontroller or similar type of processing device. Similarly, processor 76 may typically comprise a microprocessor, DSP, ASIC, microcontroller, or the like. In addition, depending on the particular characteristics of the optical system, processor 76 may be replaced by one or a plurality of amplifiers.

For example, in one embodiment, lookup table 68 may be stored in memory accessible to a DSP. The memory could be stored locally on the DSP, in a separate memory component, or in a computer linked in communication with the DSP. Based on the integrated error signal 97, the DSP may be programmed to select appropriate voltage levels through interpolation of positions stored in lookup table 68 alone, or in combination with mathematical expressions that characterize the behavior of adaptive support 52 in response to the application of various voltages to the piezoelectric elements that are programmed into the DSP.

Controlling the direction of an outgoing optical signal with servo control loop 70 works in substantially the same matter as for the incoming optical signal. However, in this case, detector 100 measures the power of an outgoing optical signal that is received by a detector at a remote location.

In the foregoing detailed description, the method and apparatus of the present invention have been described with reference to specific exemplary embodiments thereof. It will, however, be evident that various modifications and changes may be made thereto without departing from the broader spirit and scope of the present invention. The present specification and figures are accordingly to be regarded as illustrative rather than restrictive. Furthermore, it is not intended that the scope of the invention in any way be limited by the above description, but instead be determined entirely by reference to the claims that follow.

What is claimed is:

1. An apparatus for positioning a first optical component comprising:
   a flexible support member having a first end adapted to be coupled to the first optical component; and
   a plurality of piezoelectric elements mounted on a primary surface of the flexible support member, each piezoelectric element causing a localized portion of the flexible support member to extend or contract in response to a differential voltage applied to that piezoelectric element, whereby a cumulative effect produced by extension and contraction of the localized portions of the flexible support member causes an orientation and/or position of the optical component to be changed.

2. The apparatus of claim 1, further comprising:
   a plurality of electrical traces disposed on the flexible support member including connection pads coupled to inputs by which the piezoelectric elements receive respective input voltages comprising the differential voltages; and
   a connector having a plurality of pins connected to respective traces for receiving input voltages for an external source, said input voltages being received by respective inputs of the piezoelectric elements via the electrical traces.

3. The apparatus of claim 2, wherein the flexible support member comprises a printed circuit board in which a plurality of perforations are defined.

4. The apparatus of claim 2, wherein the flexible support member comprises a flex circuit.

5. The apparatus of claim 1, wherein the flexible support member further comprises a second end opposite the first end that is adapted to couple to a second optical component, thereby enabling the first optical component to be moved relative to the second optical component.

6. The apparatus of claim 5, wherein the first and second optical components have circular external configurations having respective outer diameters and the flexible support member is configured as a section of a truncated cone such that the first end of the flexible support member may be coupled to the first optical component along a portion of the first optical component's outer diameter and the second optical component may be coupled to the second end of the flexible support member along a portion of the second optical component's outer diameter.

7. The apparatus of claim 6, wherein the flexible support member has a substantially truncated pie-shaped configuration when placed in a flattened condition, and the plurality of piezoelectric elements are configured in a radial array when the flexible support member is in the flattened condition.

8. The apparatus of claim 5, wherein the second optical component comprises a primary reflector and the first optical component comprises a secondary reflector, said primary reflector receiving incoming light that is directed toward the secondary reflector, which in turn redirects the incoming light toward a focal point, said focal point being changed in response to a change in the orientation and/or coordinate position of the first optical component.

9. The apparatus of claim 5, wherein the second optical component comprises a primary reflector and the first optical component comprises a secondary reflector, said secondary reflector receiving outgoing light that is directed toward the secondary reflector, said outgoing light being reflected by the secondary reflector toward the primary reflector, said primary reflector collimating the outgoing light and reflecting it outward in a collimated beam.

10. The apparatus of claim 1, further comprising a control system that enables the first optical component to be moved to a desired orientation and/or coordinate position by supplying appropriate differential voltages to selected piezoelectric elements.

11. The apparatus of claim 10, wherein the control system includes a lookup table in which a plurality of orientation and coordinate positions are stored along with corresponding differential voltages that are applied to selected piezoelectric elements to attain those orientations and coordinate positions.

12. The apparatus of claim 10, wherein the control system includes a closed loop feedback mechanism that adjusts the orientation and/or coordinate position of the first optical component so as to maintain a maximal signal strength of an optical signal that is received by the first optical component.

13. An apparatus comprising:
   a primary reflector;
   a secondary reflector;
   an adaptive support having a first end operatively coupled to the primary reflector and a second end coupled to the secondary reflector, said adaptive support further comprising a plurality of piezoelectric elements mounted on a primary surface of a flexible support member, each piezoelectric element causing a localized portion of the flexible support member to extend or contract in response to a voltage differential applied to that piezoelectric element, whereby a cumulative effect produced by the extension and contraction of the localized portions of the flexible support member causes an orientation and/or position of the secondary reflector to be changed relative to the primary reflector.

14. The apparatus of claim 13, wherein the adaptive support further comprises:
   a plurality of electrical traces disposed on the flexible support member including connection pads coupled to inputs by which the piezoelectric elements receive respective input voltages corresponding to the differential voltages; and
   a connector having a plurality of pins connected to respective traces for receiving input voltages for an external source, said input voltages being received by respective piezoelectric elements via the electrical traces.

15. The apparatus of claim 13, wherein the flexible support member has a substantially truncated pie-shaped configuration when placed in a flattened condition, and the plurality of piezoelectric elements are configured in a radial array when the flexible support member is in the flattened condition.

16. The apparatus of claim 13, further comprising a control system that enables the secondary reflector to be moved to a desired orientation and/or coordinate position relative to the primary reflector by supplying appropriate differential voltages to selected piezoelectric elements.

17. The apparatus of claim 16, wherein the primary reflector receives an incoming optical signal that is directed toward the secondary reflector, which in turn redirects the incoming optical signal toward a focal point, said focal point being changed in response to a change in the orientation and/or coordinate position of the secondary reflector, further comprising a detector operatively coupled to the primary reflector having an input that is positioned to substantially coincide with the focal point.

18. The apparatus of claim 17, wherein the control system includes a closed loop feedback mechanism that adjusts the orientation and/or coordinate position of the secondary reflector so as to maintain a maximal signal strength of the incoming optical signal at the input of the detector.

19. The apparatus of claim 16, wherein the secondary reflector receives an outgoing optical signal that is reflected towards the primary reflector, said primary reflector collimating the outgoing optical signal and reflecting in outward toward a direction that is a function of configurations of the primary and secondary reflectors and the relative orientation and position of the secondary reflector relative to the primary reflector, further wherein the control system enables the direction of the outgoing optical signal to be controlled.

20. The apparatus of claim 19, wherein the control system includes a closed loop feedback mechanism that adjusts the direction of the outgoing optical signal so as to maintain a maximal signal strength corresponding to the outgoing optical signal as detected by a detector disposed at a remote location from the apparatus and to which the outgoing optical signal is directed at.

21. The apparatus of claim 13, wherein the primary and secondary reflectors are configured to form an off-axis Cassegrain reflective collector.

* * * * *